United States Patent
Goel et al.

(10) Patent No.: US 7,389,379 B1
(45) Date of Patent: *Jun. 17, 2008

(54) SELECTIVE DISK OFFLINING

(75) Inventors: Atul Goel, Santa Clara, CA (US); James Leong, Hillsborough, CA (US); Loellyn Cassell, Pleasanton, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 11/114,647

(22) Filed: Apr. 25, 2005

(51) Int. Cl.
*G06F 12/00* (2006.01)

(52) U.S. Cl. .......................... 711/112; 711/4; 711/114; 711/145; 711/156; 714/5; 714/6; 714/7; 714/8

(58) Field of Classification Search ................ 711/112, 711/114, 4, 145, 156; 714/5, 6, 7, 8
See application file for complete search history.

(56) References Cited

U.S. PATENT DOCUMENTS

| | | | |
|---|---|---|---|
| 5,479,653 A | 12/1995 | Jones | |
| 6,178,520 B1 * | 1/2001 | DeKoning et al. | 714/5 |
| 6,397,347 B1 * | 5/2002 | Masuyama et al. | 714/5 |
| 6,457,139 B1 * | 9/2002 | D'Errico et al. | 714/5 |
| 2003/0028719 A1 * | 2/2003 | Rege | 711/112 |

OTHER PUBLICATIONS

Final Office Action dated Oct. 9, 2007 for Pending U.S. Appl. No. 11/114,648, filed Apr. 25, 2005, inventor Atul Goel.

* cited by examiner

*Primary Examiner*—Stephen Elmore
(74) *Attorney, Agent, or Firm*—Blakely, Sokoloff, Taylor & Zafman LLP

(57) ABSTRACT

A storage system with redundant mass storage device arrays determines that a mass storage device is non-responsive, and individually offlines the specific mass storage device for a temporary period. Reads to the offline mass storage device may be temporarily prevented from reaching the mass storage device, and may be serviced by a redundant array. Write to the offline mass storage device may also be temporarily prevented from reaching the mass storage device, and may be serviced with a temporary storage management that tracks and/or stores write transactions. The mass storage device can be synchronized with the write transactions on the basis of the tracking.

26 Claims, 7 Drawing Sheets

SELECTIVE DISK OFFLINING

RELATED APPLICATIONS

This application is related to U.S. patent application Ser. No. 11/114,648 of Goel et al., entitled "Bounding I/O Service Time," and filed concurrently herewith.

FIELD

Embodiments of the invention relate to storage systems, and more particularly to selective offlining of a mass storage device of an array of mass storage devices.

BACKGROUND

A storage server is a special-purpose processing device used to store and retrieve data on behalf of one or more client devices ("clients"), which may access and/or process the data. A storage server can be used, for example, to provide multiple users with access to shared data and/or to backup important data.

A storage server may provide different levels of access to data. For example, a file server is an example of a storage server that provides file-level access to data. A file server operates on behalf of one or more clients to store and manage shared files in a set of mass storage devices, such as magnetic or optical storage based disks or tapes. The mass storage devices may be organized into one or more grouping (physical and/or logical or virtual) of Redundant Array of Inexpensive/Independent Disks (RAID). The data may be organized, managed, and/or accessed as data files. Another example of a storage server may be a device that provides clients with block-level access to stored data, rather than file-level access. The data in such a system may be organized and managed and/or accessed as data blocks, which may include more or less information than a file. Also, a storage server may be able to provide clients with both file-level access and block-level access.

A storage server may have access to multiple mass storage devices, or persistent/non-volatile storage devices, which may be managed based on logical or virtual organization. Data storage across these multiple mass storage devices can be organized into multiple layers of abstraction to provide fault tolerance, as individual disks can (and do) fail. The abstraction layers also allow a volume or aggregate to store larger quantities of data than can fit on a single disk.

For example, a storage server may represent a group of storage devices (e.g., hard disks) as a logical grouping of storage devices. In one embodiment a highest level logical grouping abstraction (e.g., data structure container) is an aggregate, which may be a container for other, lower-level logical groupings. The aggregates may be managed to store data in volumes contained within the aggregates. As used herein, volume refers to a logical abstraction of physical storage, combining one or more disks or parts of disks into a single logical storage object. The volumes may in turn be further logically broken down into plexes containing RAID groups. The RAID groups may have multiple disks. While particular terminology is used herein as a reference point to describe particular organizations and/or functions herein, the terminology shall not be construed as limiting, but rather by way of example. Where particular terminology is referred to (e.g., an aggregate, a plex, etc.), these are to be understood as merely examples of data structure abstractions that may be substituted with equivalent or similar data structures that may be referred to by other terms.

Tracking and management of the logical organization may require the management of logical association data. A disk or other storage device may have a dedicated area to provide a RAID label and/or other metadata to provide the ability to assign and determine which disks are part of which RAID groups, plexes, and aggregates, even as disks are added and failed out of the aggregates. The process of determining the logical data structure to which a disk belongs may be referred to as "RAID assimilation."

The logical organization of the disks, and the management of the disks have traditionally assumed that the disks are online and available/viewable/accessible to a storage access interface and/or layer in the storage server. However, many events, both controlled as well as spontaneous, can result in a temporary service outage to a drive. A controlled event may be an event that has a planned or expected cause, for example, a firmware download and install on the disk, replacement of a storage component, topology reconfiguration of the disk storage subsystem, etc. Spontaneous events may be those that render a disk unresponsive without any expectation on the part of the system, for example, a temporary disk failure, transient loss of connectivity/access to a disk, etc., which may occur without warning or planning. The drive can become unresponsive to I/O commands during these or similar events. Traditionally, the system may have dealt with an unresponsive disk by removing the disk from the virtual system and reconstructing the data from the disk on a spare, for example. However, often the events that render the disk unresponsive may have only a short duration (e.g., on the order of minutes), which may be much smaller than the time required to rebuild the complete data on the drive. Despite being of relatively short duration as compared to data reconstruction, these durations may be long enough to cause expensive application downtimes. Traditionally, such events have either been handled by removing the disk from a RAID group, resulting in a complete disk/data reconstruction, or by scheduling planned downtime, typically in off-hours, or other times inconvenient for service personnel.

SUMMARY

A filer ceases input/output transactions to an unresponsive storage unit to prevent access to data stored on the storage unit. Access to other storage units is still permitted. Subsequent requests for access to data stored on the unresponsive storage unit are serviced by using other disks during the period when access to the unresponsive storage unit is prevented. Access to the storage unit is restored after a period of time.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
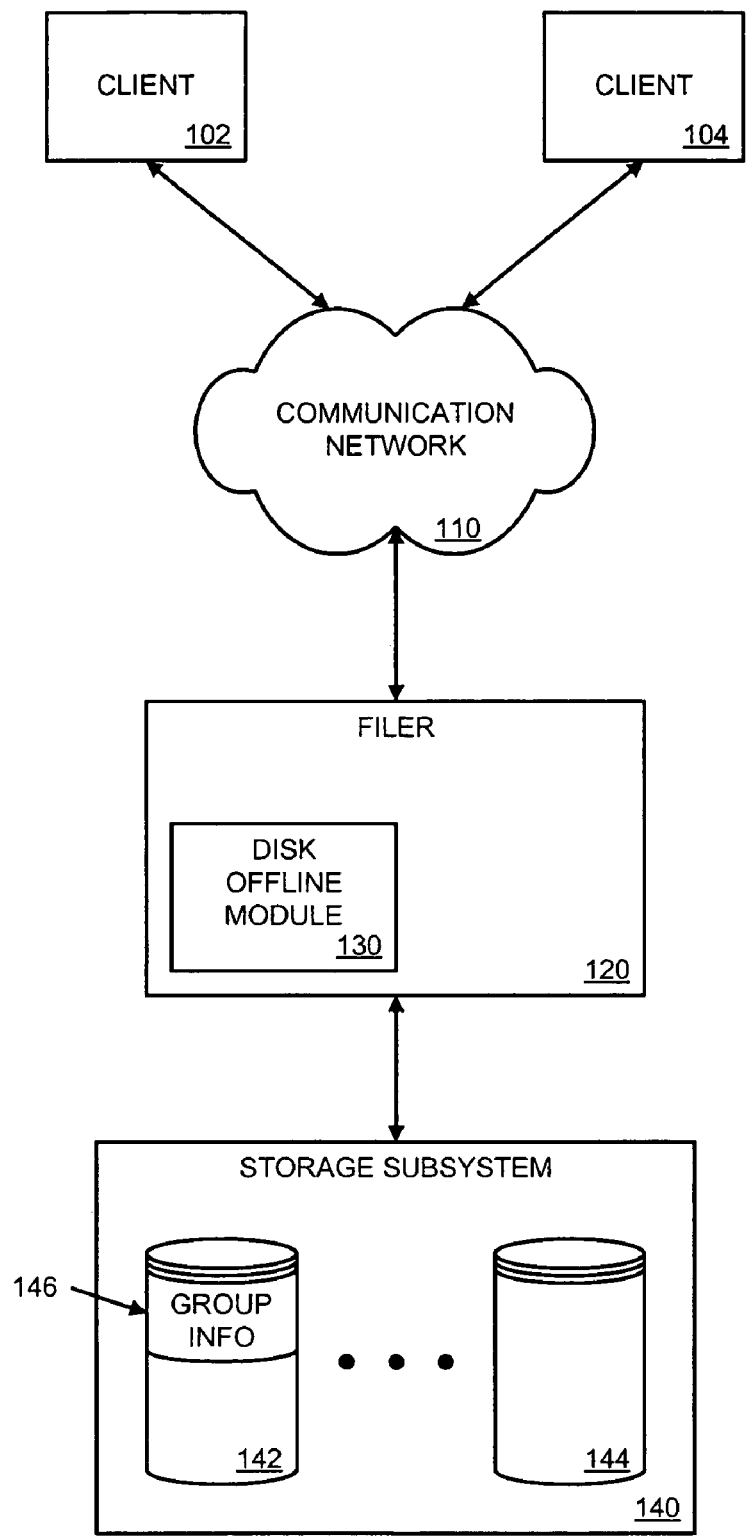
FIG. 1 is a block diagram of an embodiment of a storage system including a filer with a disk offline module.

As used herein, references to an "embodiment" may be understood as describing a particular feature, structure, or characteristic included in at least one embodiment of the invention. Thus, the appearance of phrases such as "in one embodiment," or "in an alternate embodiment" may describe various embodiments and implementations of the invention, and may not necessarily all refer to the same embodiment. Descriptions of certain details and implementations follow in a description of the figures, which may depict some or all of the embodiments presented above, as well as discussing other potential embodiments or implementations of the inventive concepts presented herein.

A redundant array of mass storage devices (e.g., RAID (redundant array of inexpensive/independent disks)) storage subsystem, or any other configuration where data on a given mass storage device can be recovered by using a subset of other mass storage devices within a protection unit, may be enabled to temporarily cease access (e.g., input/output (I/O) functions/operations/transactions) to a particular mass storage device of an array of mass storage devices. I/O functions/operations/transactions refers herein to access to a mass storage device, for example, a disk read request (or simply "read") or disk write request (or simply "write"). As used herein, mass storage devices refer to any type or form of non-volatile storage device/means suitable for storing large quantities of data. Mass storage devices include, but are not limited to, conventional magnetic disks (e.g., hard disks), optical disks, for example CD-ROM (compact disk-read only memory) or DVD (digital video/versatile disc) based storage, flash storage, solid state disk, magnetic tape, optical tape, etc. Mass storage devices may be referred to as disks, drives, storage units, hard disk, etc., but will be collectively, generically referred to herein as "disks" merely for purposes of convenience in description. Reference herein to disks should be construed only as illustrative, and not as limiting. The organization of disks into protection units refers to RAID groups, or any similar/comparable logical grouping of disks. Many types of RAID arrays or other redundant disk arrays are known, many based on standards, and others proprietary. As used herein, "RAID group" refers generically to any type of RAID array, redundant disk array. Reference to a "logical grouping" of disks is an abstraction that refers to any of multiple layers of virtual organization of physical resource, for example, a RAID group, and/or groupings of RAID groups.

Ceasing I/O to a disk may be referred to as "offlining" the disk for a period of time. The period of time could be a length of time defined for a system or an application, a length of time to recover the disk, a length of time to diagnose the reason for unresponsiveness, etc. During the offline period reads to the disk may be serviced by reconstructing data from other disks within the RAID group, reading from a backing store or data mirror, etc. A data mirror refers to a volume or other storage construct that maintains two complete copies of the mirrored data. A mirror plex is one copy of a data mirror. Writes can be logged to a "dirty region" log, which refers to a storage region/area to which updates to data on the disk may be placed while the disk is offline. In one embodiment a filesystem allows for writing out of place, or writing any-where (e.g., the write anywhere file layout (WAFL) available from Network Appliance, Inc. of Sunnyvale, Calif.), which may reduce the number of dirty region blocks and reduce the cost of synchronizing the dirty regions when the disk is brought back online. A filesystem that allows writing out of place may write to any unallocated block on any available disk in a group, and does not necessarily write to a particular location for a particular "file" or block of data. A write-anywhere filesystem may store data writes in unallocated blocks instead of writing over already allocated data blocks. Thus, data may not be overwritten, and a particular disk/block may not be used for subsequent write that change data stored at the particular disk/block. Writes could also be ignored or written to a mirror location. In a case where writes are ignored, a full reconstruct of the disk will be invoked, however, disk topology can be preserved by using disk offline because the reconstruct will occur on the offlined disk. In either case, synchronization of the disk should be invoked in conjunction with onlining the disk. These examples of dealing with reads and writes are illustrative only, and other methods and mechanisms of dealing with reads and/or writes could be used without departing from the scope of the invention.

For most purposes in data serving, the data of interest will be the newest (most recently written) version of the data, which in one embodiment may be written to the dirty region log. After the condition ends that resulted in the disk becoming non-responsive, the disk may be re-inducted back into service in the RAID group. Re-induction may include synchronizing writes to the dirty region log with data in the disk. Synchronizing refers herein to one or multiple or a series of operations to bring the re-inducted disk back up-to-date with the system. Synchronizing may include rebuilding a disk, reconstructing data from other disks, reading data from a dirty region and writing it to the disk, interpolating data from other disks, etc. Synchronizing as used herein is understood as any part of the process of re-inducting the disk back into the system, as well as the process as an entirety. Note that a stored data object may be considered up to date, or most recent, independent of how old it may be, up until a new version of the object is generated. Thus, at any given point in time the offline disk in conjunction with the dirty region log should store the most recent version of data, or the whole data, represented by the virtual and/or physical space mapped by the disk.

Temporarily offlining a disk can be transparent to clients and help increase the availability of storage servers. In one embodiment the availability of a storage server is increased by providing a software-based mechanism for isolating disks that might temporarily become non-responsive or unresponsive. An unresponsive disk may fail to respond to an access request, not complete or respond to an access request within a period of time, be unable to service other requests because of an error with a request, have a request buffer that reaches a limit or threshold number of pending requests, etc. In another embodiment the reliability of a storage server is increased by preventing a full reconstruction of all data from one disk to a spare due to a transient, or temporary and/or passing, non-disk component failure that might render a disk temporarily inaccessible.

To provide selective offlining, a trigger mechanism indicates when a disk is inaccessible and/or should be offlined. A software module on a storage access path of a filer/file server may receive certain commands and/or interpret/respond to certain conditions that indicate an offlining circumstance. A command may be issued by an administrator, a hardware component, another software module, etc. A condition may be indicated by a hardware component or software that monitors hardware conditions. At a basic level, the conditions and/or commands may also be referred to as the trigger mechanism, as they cause or result in the software module performing an action in response to the condition. Inaccessibility and/or non-responsive disk conditions may be categorized as controlled or planned, meaning those conditions a system may expect, and spontaneous or event driven, referring to conditions arising from unexpected sources, arise without warning, occur naturally in the course of operating the system, etc. Some examples of controlled conditions may include disk firmware upgrades/updates, non-disk component/hardware replacement (e.g., connectivity hardware), disk/storage topology reconfiguration, etc. Examples of spontaneous and event-driven conditions may include application timeouts, loss of connectivity, etc. These are merely examples, and is not meant as an exclusive list, or as a limitation on the types of conditions for which offlining may be invoked. Further detail regarding certain examples follows.

Disk firmware updates for some disks (e.g., FC (Fibre Channel), SCSI (small computer system interface), ATA (advanced technology attachment)) may render them unusable for the duration of the upgrade, which may be on the order of a few minutes (e.g., 1-2 minutes). Firmware downloads within a storage server are often performed after disabling client protocol services in order to avoid I/O to an affected disk. However, for some applications, such as mission critical applications, even downtimes of a couple of minutes can prove to be very expensive and undesirable. An additional consideration in firmware upgrades is that the spin-up cycle of a firmware download increases power consumption in the system, which may place constraints on the number of disks that can be upgraded in parallel. The fewer the number of disks that can be upgraded in parallel, and the larger the number of disks in a system can significantly increase the total duration of downtime for firmware upgrades. Selectively offlining particular disks can enable a non-disruptive firmware upgrade mechanism without incurring any downtime, because firmware downloads can be scheduled one disk at a time by offlining each disk in turn, thus reducing or preventing interruption in service.

As for component replacement, replacing storage components, for example, controllers, bridges, and shelves traditionally requires system downtime. However, component replacement can be planned, and disks that may be affected can be offlined while the component is being replaced. Offlining the disks can provide a relatively expeditious online mechanism for replacing components without incurring any downtime and preventing service interruption. In one embodiment a disk is replaced within a storage subsystem employing multi-drive/disk modules (MDMs) without incurring system downtime. In these systems a whole MDM must be removed/disconnected in order to replace a single disk within it. Offlining the good disks within a MDM can provide a means of replacing a failed disk without service interruption. This enables building storage configurations with high density disk packing while incurring minimum service disruption in the system.

In one embodiment a storage system supports reconfiguration of the storage topology. Changing topology configuration traditionally was implemented with disk to disk copying of data to a different disk to result in a different system configuration. With selective offlining of disks, a quick, non-disruptive disk topology reconfiguration without using additional disks can be achieved. For example, in a system that has multiple shelves of disk and multiple RAID groups per shelf, a distribution of the physical storage may be desired (e.g., for fault tolerance). With selective disk offline, a disk on a shelf could be offlined, pulled from its shelf, and inserted into another shelf. When inserted, the disk could come online and be part of the system, and data serving could continue without interruption during the disk relocation process. This process could be repeated for as many disks as are desired to be moved, without incurring system downtime.

Application timeouts can be caused by slow disks. One cause of a slow disk may be that the disk has bad media patches that can substantially increase disk access latencies if I/Os to the disk are concentrated on the bad patches. Cumulative queuing delays can result in application timeouts or system hangs if I/Os cannot be completed within a sufficient period of time to prevent overrunning the queue or another error condition. Selective offlining can enable temporary offlining of a disk plagued by access latency, thus isolating the disk from further I/O that may cause an error or a queue overflow. Isolating the disk may ensure bounds on I/O access times in the system. A slow disk can be signaled for offlining if, for example, a threshold queue depth is reached, of if an average response time is higher than a determined threshold. Further details on offlining disks for handling slow I/O access times are set forth in U.S. patent application Ser. No. TBD of Goel et al., entitled "Bounding Data Access," and filed concurrently herewith.

As for lost connectivity, a storage component (e.g., hardware) may suffer instabilities or transient errors that cause a loss of access to one or more disks. Transient errors may not be permanent errors, but result in temporary instabilities, and may in some cases pass without intervention if given sufficient time. Examples of transient errors include conditions where hardware components (e.g., loops, controllers etc.) used to connect disks to a storage subsystem may suffer operational errors. Although the disks themselves may remain intact and the data stored thereon is valid, the loss of connectivity may be treated in some systems equivalent to a disk failure. Disk failure may in turn trigger a disk reconstruction, which not only has a substantial performance impact but also causes exposure to potential data loss in the reconstruction process due to any media/checksum errors found on other disks. Often, the hardware components recover automatically or can be restored to a working state by a simple and fast reinitialization process. The cost of delay in terms of time and service interruption for recovery may be substantially less (e.g., orders of magnitude) than what would be incurred to reconstruct the disk(s). By selectively offlining one or more disks affected by a component glitch, a system may have a mechanism for preventing unnecessary reconstructions during transient connectivity loss. The rebuilding process may be delayed until the reasons for failure is determined and/or a period of time has expired. In case of a loss of connectivity, once the hardware component has recovered, the disk can be reinducted back into the system following a much faster and lightweight resynchronization process.

Providing selective offlining further includes a disk isolation mechanism. Disk isolation may include hardware and/or software to temporarily prevent access to the disk. In one embodiment I/O fencing is performed, which prevents reads, writes, and/or logical/virtual (e.g., volume) configuration updates to the offline disk. The implementation of I/O fencing may be dependent on the underlying management of the disk by the filer, and may include marking as degraded a RAID group to which the disk belongs. A code object representing the disk may be restricted from having certain functions performed on it by the filer code. The code refers to software or source code that defines the logical system, its components, and functions. A code object refers to a software elements or entities that have particular attributes, as is understood by those familiar with object-oriented programming. Generally, objects are defined as having particular traits, and may refer to values or data structures that are operated on by a system according to their traits. Disk isolation may be completed by having reads to the disk serviced by reconstructing or rebuilding the data from other disks. The number of disks per physical or virtual group/subgroup that can be simultaneously offlined may be related to a level of redundancy. The level of redundancy may determine how many disks can be offlined without causing a loss of ability to service data read/write requests for data in the group.

Disk isolation may include the use of a new state for a disk object in filer code to represent an offline disk to restrict one or more operations on a disk indicated by the state. Despite being offline, the original parent RAID group may still serve as the container for the offline disk. Preserving the association of the offline disk with the parent RAID group may allow event notifications (e.g., pull/fail) and group wide operations (e.g., destroy) to be handled seamlessly without modification to the configuration management framework. Preserving the association may also prevent the disk from coming back online and being incorporated into a different group. If a disk is offlined that is not part of a RAID group, for example, a spare, the disk may maintain its metadata information to indicate it is a spare, similarly to how a disk in a RAID group may maintain metadata to indicate its association, and the offline disk can be brought back online and returned to its previous state (i.e., a virtual state in the system occupied by the disk prior to offlining).

In one embodiment selective offlining may include the ability to log writes to an offline disk, rather than merely preventing writes to the disk. For example, a dirty region could be established in core, or on a disk-based persistent log. A fine-grained dirty region bitmap can additionally be used to track stale regions on the offline disk. In one embodiment the filer includes a write-out-of-place filesystem, which may allow flexibility in data placement. For example, such a filesystem may allow skipping allocation to an offline disk, and thus substantially reduce the number of dirty blocks. Virtual mapping tables, or areas of storage having multiple discrete entries, may thus reflect the filing of the data in the allocated location. After the offline disk is brought back online, the filesystem may elect to re-optimize data placement by again using the disk.

An offlined disk may be brought back online and resynchronized with the system. Onlining a disk may be the reverse of offlining the disk, and normal read and write I/Os can be resumed to the disk after it is onlined. As some data may have been written to dirty regions, data may exist in the dirty region log. If a read is made to a dirty region of an offline disk, the read should be serviced via reading data from the log. A read to data of the offline disk not stored in the dirty region should be serviced by rebuilding the data from other disks within the RAID group. When a disk is brought back online, reads to data written in the dirty region should still be serviced by reading the dirty region, while other reads can be serviced by reading the disk.

The offlined disk may be re-synchronized by copying data from the dirty region log to the disk. This may occur prior to onlining the disk, but synchronization after onlining may be possible. If the filer only maintains a dirty bitmap log, and not the data, the dirty ranges can be reconstructed from other disks within the RAID group.

In one embodiment the selective offlining may include an error handling mechanism to deal with errors in the event that a disk may be temporarily offline. In the event of a second disk failure or a medium error on another disk within the RAID group, the offline disk can be forced online, if possible, to prevent a fatal multi-disk error. The possibility of forcing the disk online may depend upon the condition that caused the disk to be offlined.

FIG. 1 is a block diagram of an embodiment of a storage system including a filer with a disk offline module. Filer 120 includes a storage server with a disk offline module 130. Filer 120 may provide file-level services, as with traditional file servers, and alternately, or in addition, may provide block-level services. Thus, the filer 120, as used herein, may refer to a storage server that provides file-based (e.g., NAS (network attached storage)) services, or alternatively, or in addition, a storage server that provides block-based (e.g., SAN (storage area network)) services. The data services, whether file-level or block-level, may include providing access to a storage subsystem 140, for either data storage and/or data retrieval. Data storage and retrieval are examples of disk I/O that may be performed with disks 142 and 144.

Filer 120 may be coupled locally to storage subsystem 140, which includes one or more mass storage devices 142-144. Mass storage devices 142-144 in storage subsystem 140 may be, for example, conventional magnetic disks (e.g., hard disks), optical disks such as CD-ROM or DVD based storage, magneto-optical (MO) storage, solid state disk, magnetic tape, optical tape, and/or any other type of non-volatile storage devices suitable for storing large quantities of data. Filer 120 may include one or more connectors and/or connection ports with which to couple to storage subsystem 140 and/or one or more of its sub-elements. The connectors and/or ports may be connection points for fiber channel, coaxial cable, twisted-pair communication lines, and/or secure wireless connections. Filer 120 manages storage subsystem 140, including receiving and processing read and/or write requests to data stored in storage subsystem 140, maintaining data structures, organizing the physical resources of storage subsystem 140 into logical storage resources, etc. The data structure and logical storage resources are constructs for storage management to allow more storage in a system, provide reliability in storage access, etc.

In one embodiment mass storage device 142 is shown having group information 146. Group information 146 may include one or more values, data structures, pointers, etc., to indicate a logical association of mass storage device 142 with other mass storage devices. Thus, group information 146 may represent metadata stored on mass storage device 142 to indicate a place of mass storage device 142 in the logical organization of the physical resources. Group information 146 may indicate a data structure to which mass storage device 142 belongs.

Filer 120 may also be coupled to one or more clients 102-104 through communication network 110. Communication network 110 may be, for example, a local area network (LAN). Each client 102 and 104 may be a conventional desktop computer, a laptop, workstation, a network server, etc. Clients 102 and 104 may generate requests for access to data on storage subsystem 140. Filer 120 may provide the requested functions to clients 102 and 104, depending on what request is made, what permissions a client has, etc.

Filer 120 may have a distributed architecture. Thus, in one embodiment filer 120 may include a separate N-("network") blade and a D-(disk) blade (neither shown in FIG. 1). In such an implementation the N-blade couples filer 120 to communication network 110 to communicate with clients 102-104, and the D-blade includes the file system/storage management functionality and couples filer 120 to storage subsystem 140 to communicate with the corresponding storage resources. The N-blade and D-blade communicate with each other using an internal protocol. Alternatively, filer 120 may have an integrated architecture, where the network and data components are contained within a single box and/or single circuit component/manufacture. Filer 120 further may be coupled through a switching fabric to other similar filers/file servers (not shown), each having its own local storage subsystem. In this way, one or more storage subsystems can form a single storage pool, to which a client of any of the file servers may be provided access.

Figure 2:
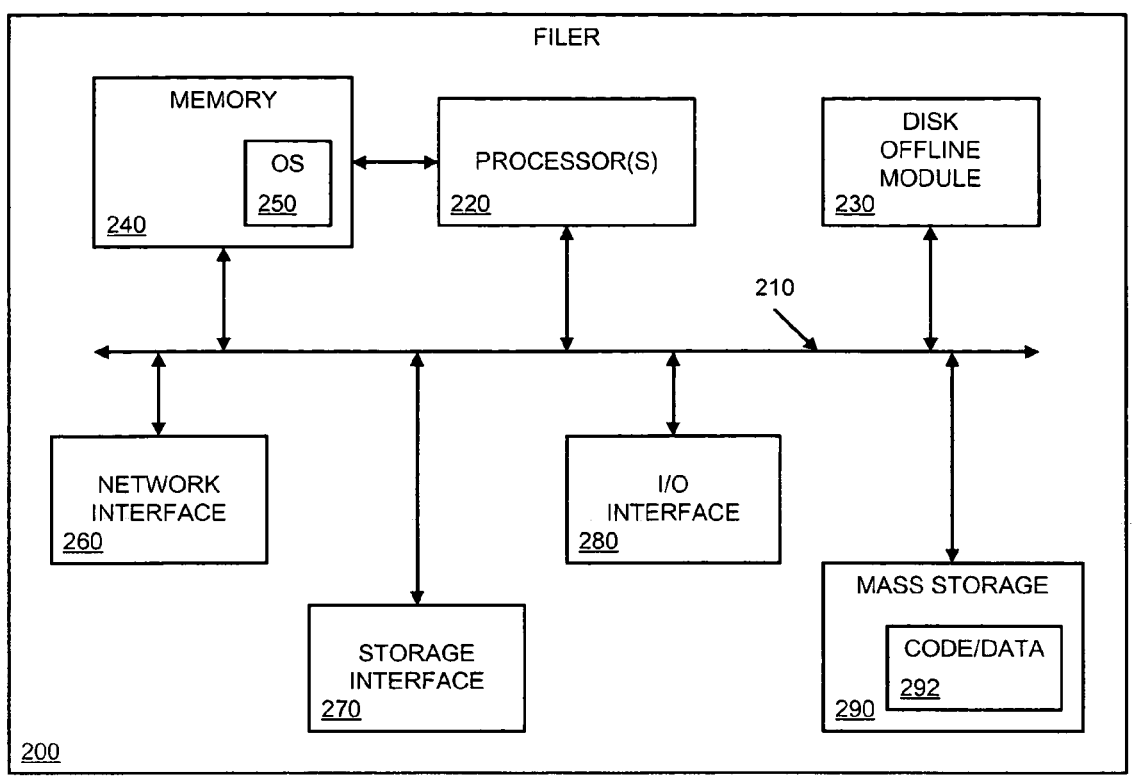
FIG. 2 is a block diagram of an embodiment of a filer.

FIG. 2 is a block diagram of an embodiment of a filer. Filer 200 provides one example of filer 120 of FIG. 1, and may include other components/subparts in addition to what is depicted in FIG. 2. Thus, filer 200 may be more complex than what is shown. Filer 200 includes one or more processors 220, and memory 240 coupled to processor 220. Processor 220 may include any type of microprocessor, central processing unit (CPU), processing core, etc., suitable for executing the functions of filer 200 within the performance criteria determined for the system design. Processor 220 controls the overall operation of filer 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 240 may represents the main memory of filer 200, and may provide temporary storage for code to be executed by processor 220. Memory 240 may include read-only memory (ROM), flash memory, one or more varieties of random access memory (RAM), or the like, or a combination of such devices. Memory 240 stores, among other things, operating system (OS) 250 that provides one or more functions of filer 200. OS 250 may include one or more functions for selective disk offlining, as described herein.

In one embodiment filer 200 includes a disk offline module 230, which provides one example of an offline module that may implement offline module 130 of FIG. 1. Disk offline module 230 depicted in FIG. 2 is an abstraction to represent the one or more functions provided by filer 200 to perform functions related to offlining one or more specific disks, while leaving other disks and the system online. While specifically referring to disks as providing examples herein, any type of disk, storage unit, drive, etc., may be used. The offlining functions may be provided as a separate module, as shown, or may be provided by one or more components of OS 250. Thus, disk offline module 230 is to be understood as merely illustrative of the functionality provided to offline specific disks, and is not limited to a particular implementation. Disk offline module 230 could be provided as a programmable circuit component coupled to bus system 210, as part of OS 250, as part of an application/program executing on top of OS 250, or some combination of these.

Processor 220 and memory 240 may be coupled to a bus system 210. Bus system 210 is an abstraction that represents any one or more separate physical buses, communication lines/interfaces, and/or point-to-point connections, connected by appropriate bridges, adapters, and/or controllers. Therefore, bus system 210 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Also coupled to processor 220 through bus system 210 are one or more network interface(s) 260, one or more storage interface(s)/adapter(s) 270, one or more input/output (I/O) interface(s) 280, and one or more internal mass storage device(s) 290. Network interface 260 provides filer 200 with the ability to communicate with remote devices (e.g., clients) over a network and may be, for example, an Ethernet adapter. Storage interface 270 enables filer 200 to access a storage subsystem and may be, for example, a Fibre Channel adapter, a SCSI adapter, etc. Filer 200 may typically be accessible to electronic or computer "users" rather than human users. Thus, I/O interface 280 may include one or more interface components to connect filer 200 with other electronic equipment, for example, custom connections, blade adapters, etc. Additionally, filer 200 could be made to be accessible to a human user, and thus have video, audio, and/or alphanumeric interface through I/O interface 280. Internal mass storage 290 may be or include any conventional medium for storing large volumes of data in a non-volatile manner, such as one or more magnetic or optical based disks. Mass storage 290 may hold data/instructions in a persistent state (i.e., the value may be retained despite interruption of power to filer 200). In a generic sense mass storage 290 is a "memory," although memory 240 is the executing or operating memory to provide instructions to processor 220. In one embodiment mass storage 290 includes code and/or data 292 that may be accessed and placed in memory 240 for execution by processor 220. Code/data 292 may include machine instructions to provide disk offlining functions.

Figure 3:
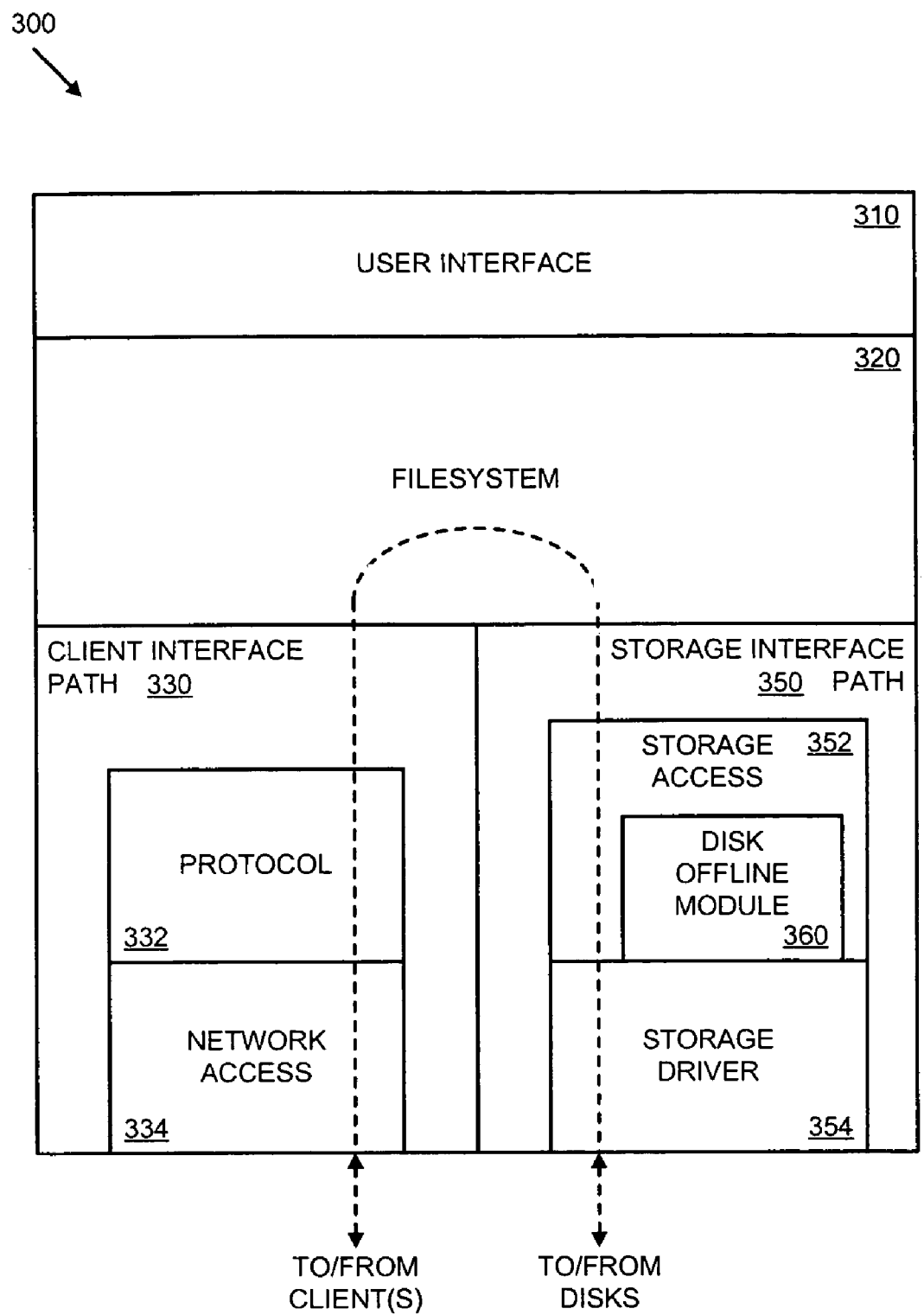
FIG. 3 is a block diagram of an embodiment of a storage server operating system.

FIG. 3 is a block diagram of an embodiment of a storage server operating system. Operating system 300 may be one example of an operating system that could implement OS 250 of FIG. 2. As shown, operating system 300 includes several modules or functional components, which may also be referred to as "layers." One layer may include user interface 310, to provide access to a user, for example, a human user, a management system, a diagnostic server, etc. Logically below user interface 310 may be file system 320. File system 320 is application-layer software that tracks/maintains a directory structure (hierarchy) of data stored in an associated storage subsystem, and manages read/write operations on the data (i.e., executes read/write operations on the disks in response to requests). Logically below file system 320, operating system 300 also includes client interface path 330, and storage interface path 350.

Client interface path 330 is depicted with protocol layer 332 and network access layer 334 associated with protocol layer 332, to allow file system 320 access over a network with clients. Client interface path 330 may be understood to include more components than what are depicted in FIG. 3. Protocol layer 332 implements one or more of various higher-level network protocols, such as Network File System (NFS), Common Internet File System (CIFS), Hypertext Transfer Protocol (HTTP), Transmission Control Protocol/Internet Protocol (TCP/IP), Fibre Channel Protocol (FCP), and/or iSCSI Protocol (SCSI over TCP/IP). The protocol may be different for separate connections to different clients. The protocol may be established prior to operation of the system, or negotiated at run time. Network access layer 334 includes one or more drivers or other medium-interface software routines/programs that implements a lower-level protocol to implement the protocol of protocol layer 332 in a physical interface to communicate over the network, such as Ethernet.

Storage interface path 350 includes storage access layer 352 and storage driver layer 354 associated with storage access layer 352, to enable file system 320 to communicate with one or more disks and/or other storage resources in a storage subsystem. Storage interface path 350 is also to be understood as merely representative, and may include more components and/or layers than what are depicted. Storage access layer 352 implements a disk storage protocol, and storage driver layer 354 implements a lower-level disk access protocol, such as Fibre Channel Protocol (FCP) or SCSI, which may implement commands/requests made by the higher level protocol. To facilitate the description of the following details herein, it will be assumed that storage access layer 352 implements a RAID protocol, such as RAID-4, RAID-DP (created by Network Appliance Inc.), etc., and therefore may alternatively be referred to as RAID layer 352. FIG. 3 also shows a dashed line to represent a data flow path between a client and a disk, through the layers of client interface path 330, file system 320, and storage interface path 350. In one embodiment movement of data may be orchestrated at different layers, and does not necessarily travel physically through all of the layers represented. For example, data may be moved directly from the storage subsystem to client memory (i.e., direct media access (DMA)).

In one embodiment storage access layer 352 includes disk offline module 360, which is an example implementation of an offline module as previously discussed. Storage access layer 352 may detect disks accessible through storage driver 354 and organize the disks into logical data structures. These data structures may include RAID groups, plexes, aggregates, volumes, and/or any similar or equivalent data container abstraction. Disk offline module 340 provides storage access layer 352 the ability to selectively affect the organization of the logical data structures. For example, a disk may be requested to be taken offline for some planned system change (e.g., firmware update, component replacement) or become unresponsive to filesystem 320 and disk offline module 340 may determine to mark the disk for offlining. Disk offline module 340 may provide a mechanism between filesystem 320 and the disk to temporarily interrupt I/O to the disk to isolate it from the system until the offline downtime is complete. The offline time can be completed by the fulfillment of the system change or the correction of the condition that resulted in the unresponsiveness. When the offline condition should no longer apply, disk offline module 340 can remove the disk from isolation, and allow the normal assimilation mechanisms of storage access 352 to bring the disk back online, and viewable to filesystem 320.

Figure 4:
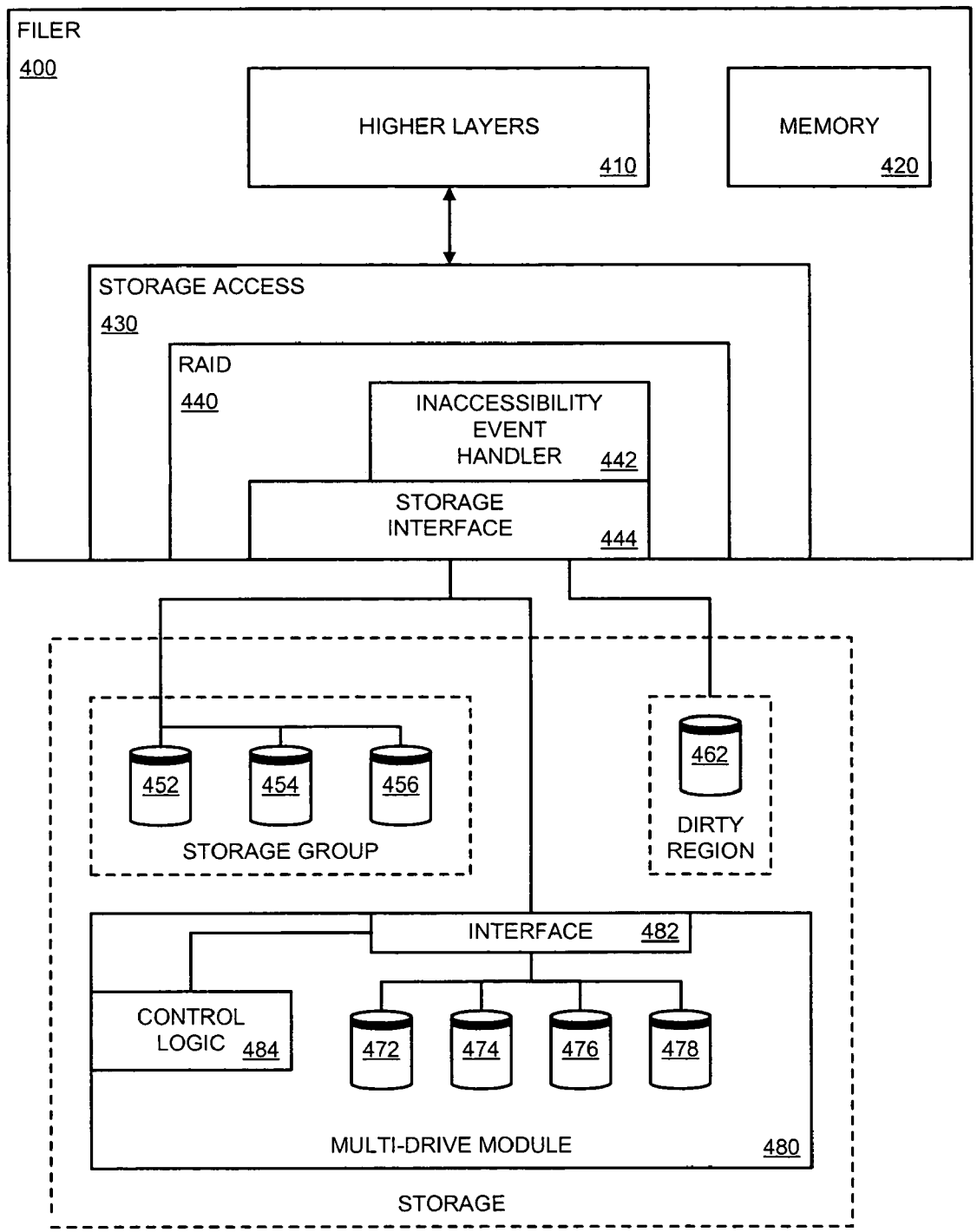
FIG. 4 is a block diagram of an embodiment of a filer having storage access with an inaccessibility event handler.

FIG. 4 is a block diagram of an embodiment of a filer having storage access with an inaccessibility event handler. Filer 400 represents an example of a filer/file server as previously discussed, and is shown in FIG. 4 with some of the layers of an operating system that may be present on filer 400, such as OS 300 of FIG. 3. Higher layers 410 represent layers higher than storage access layer 430, which may be a storage access layer as described in FIG. 3, as discussed above. Higher layers 410 may include, but are not limited to having, a file system and a storage server kernel. In one embodiment, higher layers 410 include a write-anywhere file system, such as the WAFL system.

In one embodiment filer 400 includes memory 420, which may have one or more elements of volatile or non-volatile storage. For example, memory 420 may include RAM. Memory 420 may refer to a physical resource of filer 400, or it may refer to a persistent or temporary storage resource accessible to filer 400 that is not necessarily part of filer 400. In one embodiment memory 420 is a memory allocation of the main memory of a system to which filer 400 belongs. Memory 420 may include information referencing the storage on disks 452-478, and may store information to indicate if one or more of disks 452-478 are offline, or an indicator to take one or more disks offline. For example, a data structure representing a virtual layout of the physical disks 452-478 could exist in memory 420, and be modified to change an object representing a disk, and/or assign an attribute to an object representing a disk to indicate offlining one of the disks.

Storage access 430 may include hardware (e.g., ports, interfaces) and/or software (e.g., a RAID layer) to see and organize the storage in a virtual representation. Storage access 430 includes RAID 440, which sees/detects the physical resources (e.g., disks) of the system and provides logical data structures. For purposes of description, and not by way of limitation, FIG. 4 will reference disks as the physical resources, and RAID groups, volumes (which may be understood as traditional, or virtual volumes), and aggregates as the data structures. Other and/or additional data structures may be included within the system, and physical resources besides, or in addition to, disks may be used. RAID 440 provides the logical hierarchy of the system resources, and thus provides the RAID groups and aggregates.

RAID 440 operates under a RAID protocol, e.g., a mirroring RAID protocol (e.g., RAID-1), or a striping protocol (e.g., RAID0, RAID-4 (striping with single parity), RAID-DP (striping with double parity), etc.). The particular RAID protocol implemented by RAID 440 may determine how reads and writes are serviced for offline disks or how many disks may be offlined simultaneously, but should not be understood as limiting. The techniques described herein may be applied to systems implementing a variety of RAID protocols.

Within RAID 440, or logically below RAID 440 may be one or more storage interface components 444. RAID 440 may include one or more components, not shown, to access and manage the storage through storage interface 444, such as an assimilation module to provide physical to logical mapping of the physical resources to higher layers 410 of filer 400. Thus, filer 400 may "see" the physical resources as represented in the logical view, with the disks allocated by RAID 440 for storage. The particular allocation of the physical resources may not be significant to filer 400, which will simply provide storage services to clients based on what resources are seen as available for the clients.

The storage of the system of FIG. 4 may include more disks than what is shown. In one embodiment disks in the storage are organized, physically and/or virtually, in groups. For example, the storage group including disks 452-456 may represent either a physical or a virtual grouping of disks. As a physical grouping, the storage group may represent a set of disks that share a common storage access component, for example, disks on a shelf in a storage system. As a virtual grouping, the storage group may represent disks that are part of the same RAID group, for example.

Consider if disk 452 of the storage group were rendered inaccessible due to a controlled or spontaneous condition, inaccessibility event handler 442 may detect the condition and mark disk 452 for offlining. If the total number of inaccessible disks (failed or offline) in a logical group of which disk 452 were a part is less than or equal to the protection offered by the RAID/redundancy group, inaccessibility event handler 442 can offline disk 452 until the condition can be overcome. For example, for a RAID4 group containing disk 452, only one disk can be failed or offline at a time, because RAID4 only offers single disk failure protection. In another example, a RAID-DP group containing disk 452 could survive two disk failures, meaning two disks could be simultaneously offlined or failed. With disk 452 offline, reads from and writes to disk 452 may be intercepted by inaccessibility event handler 442. Assuming for discussion purposes that the storage group represents a RAID group, reads that may be requested for data stored on disk 452 can be serviced by reconstructing (e.g., interpolating) the data from other disks in the RAID group. Writes, may be serviced by allocating a disk, a partition of a disk, some storage region, which may be within the RAID group or in a different logical location in the system, represented in FIG. 4 by dirty region disk 462, a dirty region log, to which write requests are written. Thus, dirty region disk 462 is to be understood as an abstraction of storage in which to log writes directed to disk 452 while disk 452 is offline. Dirty region disk 462 may not be a disk at all, but a collection of locations within disks of the storage to which the information/data associated with the write requests has been written. With a write anywhere filesystem, the footprint of a dirty region area may be significantly minimized, as discussed previously. In conjunction with dirty region disk 462, a dirty region bitmap or table is executed to track or indicate regions of offline disk 452 that have been written while offline. The dirty region bitmap may be stored in memory 420 for execution, and additionally can be stored on one or more disks of the storage subsystem. In one embodiment a RAID-DP storage system stores a dirty region bitmap persistently on two disks of the same RAID group to survive the failure of another disk within the group.

In one embodiment a multi-drive/disk module (MDM) 480 is present in the system. MDM 480 represents many different hardware implementations of a common idea, to place multiple disks 472-478 on a single hardware component, MDM 480, having a common interface 482 and control logic 484 for accessing the disks. Interface 482 may include one or more physical connectors/ports, and associated hardware. Control logic 484 may include multiple electronic components, and may include a processor to control storage on MDM 480. The primary advantage of MDM 480 is storage density, with multiple disks 472-478 on a single device, with a single storage interface 482.

In one embodiment a disk on MDM 480 may fail, rendering at least a portion of the storage unavailable. In such a case, inaccessibility event handler 442 may offline disks 472-478, assuming doing so will not destroy a logical organization. The offlining can give MDM 480 time to correct the error, or give time to remove MDM 480, replace the failed disk with another disk, and reinsert MDM 480 into the system. Thus a disk within a high density packing, e.g a MDM, which is affected by a hardware glitch, can be replaced by offlining the remaining disks and then replacing the faulty disk after removing the MDM. Once the MDM is reinserted into the system, the offline disks can be onlined again. The entire process can be performed without causing any system downtime.

Figure 5:
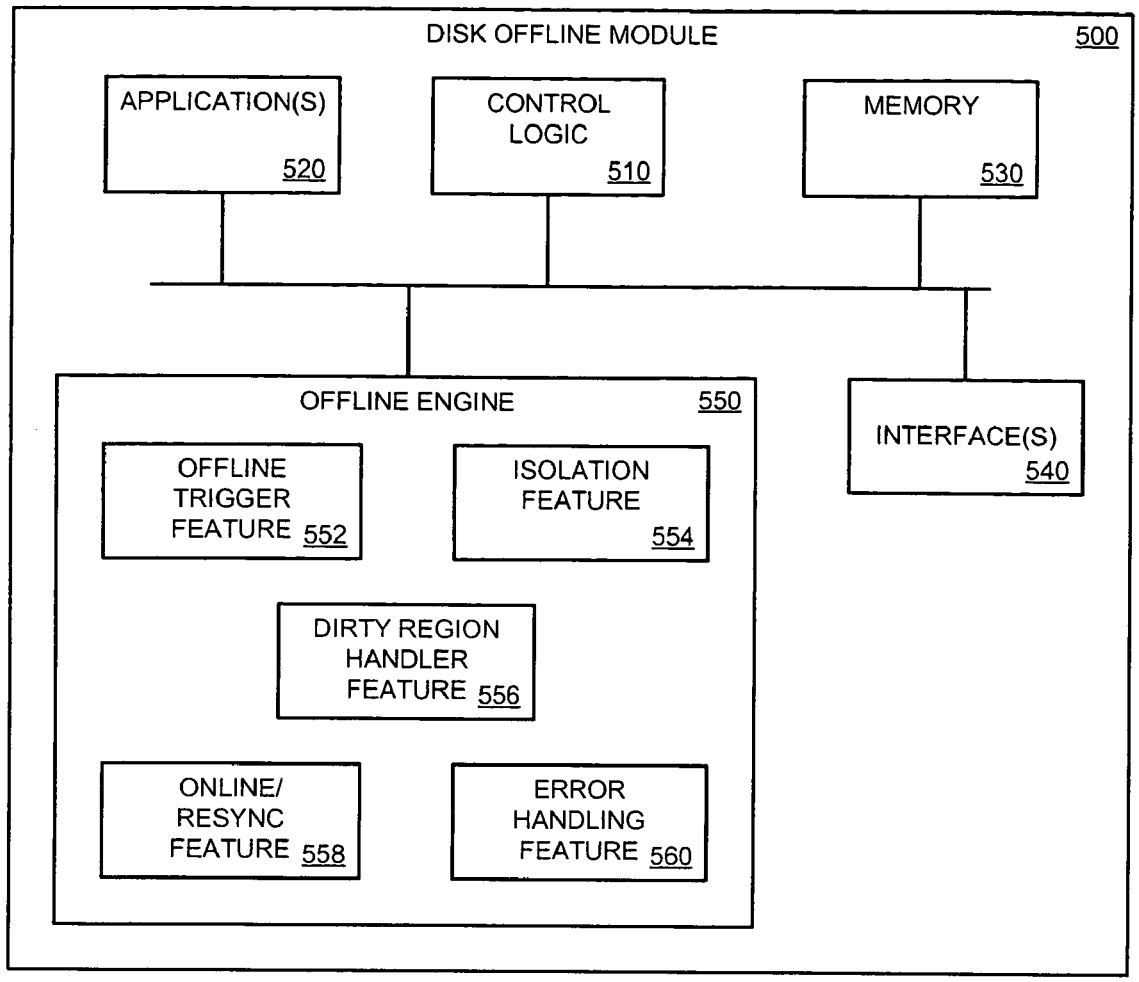
FIG. 5 is a block diagram of an embodiment of a disk offline module.

FIG. 5 is a block diagram of an embodiment of a disk offline module. Disk offline module 500 includes control logic 510, which implements logical functional control to direct operation of module 500, and/or hardware associated with directing operation of module 500. In one embodiment module 500 includes one or more applications 520, which represent code sequence and/or programs that provide instructions to control logic 510. Module 500 includes memory 530 and/or access to memory resource 530 for storing data and/or instructions. Module 500 also includes one or more interfaces 540, which represent access interfaces to/from module 500 with regard to entities (electronic or human) external to module 500.

In one embodiment module 500 is employed in a filer/file server, as described previously. In an alternate embodiment, a controller (e.g., a processor executing filer functions) in a hardware disk array or a shelf enclosure includes one or more elements of module 500. Thus, a filer and a hardware controller may operate together to provide the functionality of module 500, or the filer or hardware controller may provide the functionality of module 500 separately from the other. In an embodiment module 500 resides in a hardware controller or shelf component, and the hardware controller/shelf component includes a RAID layer to implement system-level disk management traditionally handled by a filer/file server. Such a RAID layer may be in addition to a RAID layer in a filer, or in lieu of needing a RAID layer at the filer, although a management module may be needed at the filer in such an implementation to coordinate the operation of potentially multiple RAID layers from multiple hardware components.

Module 500 also includes offline engine 550, which represents one or more functions that enable module 500 to individually, selectively offline disks and manage reliability and/or synchronization issues related to offlined disks. The functions include one or more of offline trigger feature 552, isolation feature 554, dirty region handler feature 556, online/resynchronization feature 558, and error handling feature 560. Other features may be included, making other versions of the offline engine that are more or less complex than what is shown in FIG. 5.

Offline trigger feature 552 enables offline engine 550 to detect an unresponsive disk and/or determine that a disk is not servicing I/Os. Offline trigger feature 552 includes logic/code to receive and process commands requesting a disk be offlined for an amount of time to allow for a planned down time for the disk. Offline trigger feature 552 includes error and/or exception handling routines to deal, for example, with a queue overflow with respect to I/O for a particular disk, or some other condition that indicates the disk is unresponsive. Errors (e.g., performance problems) and exceptions (e.g., unexpected conditions and/or errors) that represent actual triggers can be received from entities outside of disk offline module 500, as well as from control logic 510 or control software (e.g., a main loop, an operating routine, or operating system) executing on control logic 510 from memory 530 or application 520. Offline trigger feature 552 may also include the ability to edit metadata on the disk or data kept in the system that is associated with the disk to indicate that the disk is to be logically isolated from the system (and potentially physically isolated as well in the case of component swapping).

Isolation feature 554 enables offline engine 550 to isolate a specific disk from interoperation with the system, while maintaining normal operation of other parts of the system. Traditionally an entire system, or an entire section of a system may have been simultaneously brought offline to handle an error in the operation of the system. With the isolation feature, a particular disk can be targeted for offlining, while leaving the remainder of the system intact. For example, the disk can be prevented from engaging in I/O, as requests may be diverted away from the disk to be handled by other parts of the system. This may include a routine to prevent a read request from reaching the disk and servicing the request with other disks in the same logical group, or with access to a mirror/backup. Isolating the disk can include preventing upper layers of a file server system from being able to view the disk.

Dirty region handler 556 enables offline engine 550 to handle a log and/or storage of write requests made to an offline disk. As discussed previously, logging write requests may include having a bitmap to indicate which sectors of a disk were affected by write requests during an offline period. Alternatively a dirty region bitmap may be kept without logging the writes, and data can be reconstructed to the disk from other disks in a logical group for regions indicated in the dirty region bitmap. In an alternate embodiment writes can be ignored or written to a data mirror or a backup without affecting the offline disk.

Online/resynchronization feature 558 enables offline engine 550 to bring a disk back online. The onlining process may simply involve removing constraints placed on the disk, for example, by removing an object property that results in the I/O requests to the disk being handled by standard, rather than special offline, routines/procedures. Resynchronizing a disk may involve copying information written to dirty regions or data mirrors, and/or rebuilding sections of the disk indicated by a dirty region bitmap.

Error handling feature 560 enables offline engine 550 to provide for forcing a disk out of an offline state, for one or more I/O requests, when doing so may prevent a larger system failure. For example, if a disk were being updated with new firmware, the disk may be offlined and expected to be offlined for the duration of the firmware update. However, if during the update another disk in the same RAID group were to fail, error handling feature 560 may determine that two offline or "failed" disks in the same RAID group would cause the entire RAID group to fail, and direct aborting of the firmware download. The disk in the middle of the firmware update could then be forced back online to prevent the RAID group from failing.

Disk offline module 500 may include hardware, software, and/or a combination of these. In a case where module 500 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 6:
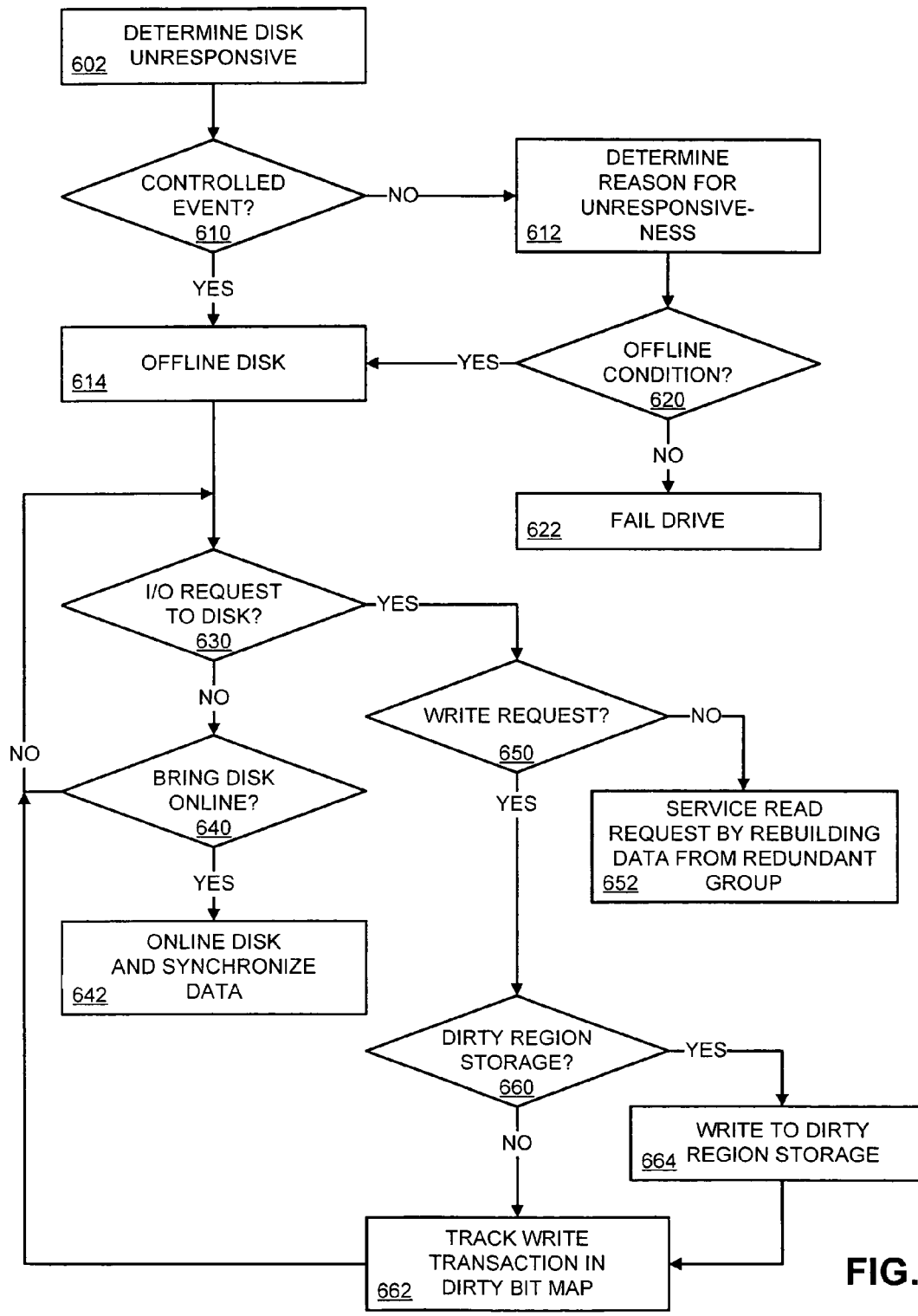
FIG. 6 is a flow diagram of an embodiment of a process for handling an unresponsive drive.

FIG. 6 is a flow diagram of an embodiment of a process, in a filer, of handling an unresponsive disk. A filer determines that a disk is unresponsive, 602. The disk may be unresponsive for a variety of reasons, which in one embodiment can be grouped as "controlled" or "spontaneous" events. Controlled events can be logged/recorded in a database/table that the filer can check to determine if the disk is scheduled for offlining. If the disk is not scheduled for offlining and is unresponsive, it may indicate that the disk has experienced a spontaneous unresponsiveness event. The filer can perform diagnostics on a disk to determine what caused the disk to become unresponsive. If the unresponsiveness is not caused by a controlled event, 610, the filer determines the reason for the unresponsiveness, 612, for example, through disk diagnostics. The reason may be determined to be a hardware instability or some other transient failure that may be correctable, either without intervention from the filer (e.g., an automatic re-initialization by the hardware component), or by the filer allowing time for the disk (e.g., a slow disk backed up with requests to service). I/O can cease to prevent I/O to a failed disk, or to allow a slow disk to catch up. If the condition is some such condition that is determined to be correctable by a component/module of the filer, the condition may be referred to as an "offline condition," meaning a condition that may be correctable by offlining the disk.

If the condition cannot be corrected by a short offline period, 620, the disk is failed, 622, and a full reconstruction of the disk can be performed. Note that despite what is depicted in FIG. 6 is but one example of the process as it may occur. In one embodiment all unresponsive disks may be offlined, and while the disk is temporarily offline, the filer may determine if the disk should remain in an offline state (e.g., determining the reason for unresponsiveness), or if the disk should be failed. Determining if the disk should remain offline may include performing an error analysis on the disk to determine what caused the unresponsiveness.

If the event is a controlled event, 610, or if the condition is an offline condition, 620, the disk is taken offline ("offlined"), 614. Offlining a selected disk in this context isolates a single disk from the system and allows the system to run in a degraded mode, but still be able to function without having to incur costly down time. This involves permitting or allowing I/O to online disks while ceasing and/or preventing I/O to the disk to offline. While the disk is offline, one example of management of the disk is as represented as in FIG. 6. The filer determines if an I/O request in the system is directed to the offline disk, 630. The filer also determines if there is any change in status of the disk, and issues a command to bring the disk back online, 640. Determining if I/O is directed to the disk and determining if the disk should be onlined may be continuously monitored, as shown in FIG. 6 by the fact that if neither circumstance applies, the conditions are checked again. Continuous monitoring may be accomplished on the basis of response to a change in circumstance (e.g., a software interrupt, a direct command, etc.), or through polling a disk status table or reading information from the disk or another location in the system.

If the circumstances change for a disk, it is placed online ("onlined"), and data in the disk is synchronized with data indicated in a dirty log, 642. If there is an I/O request to the offline disk, 630, the filer determines if the request is a read request or write request and handle each in a different manner. If the request is not a write request (specifically, if it is a read request), 650, the read is serviced by rebuilding relevant data from other disks in the RAID group, 652. If the request is a write request, the filer determines if there is a dirty region storage to which the write can be written, 660, or if writes will be handled in a different manner.

If there is no dirty region, the filer logs the write transaction in a dirty bit map, 662, to indicate the affected memory location(s) of the offline disk. This preserves the ability to synchronize data when the disk is brought back online. If there is a dirty region, in one embodiment the filer both writes the transaction to the dirty region storage, 664, and log the transaction in a bit map, 662. The process then continues to wait to determine if another I/O request is made, or whether the disk is to be brought back online.

Figure 7:
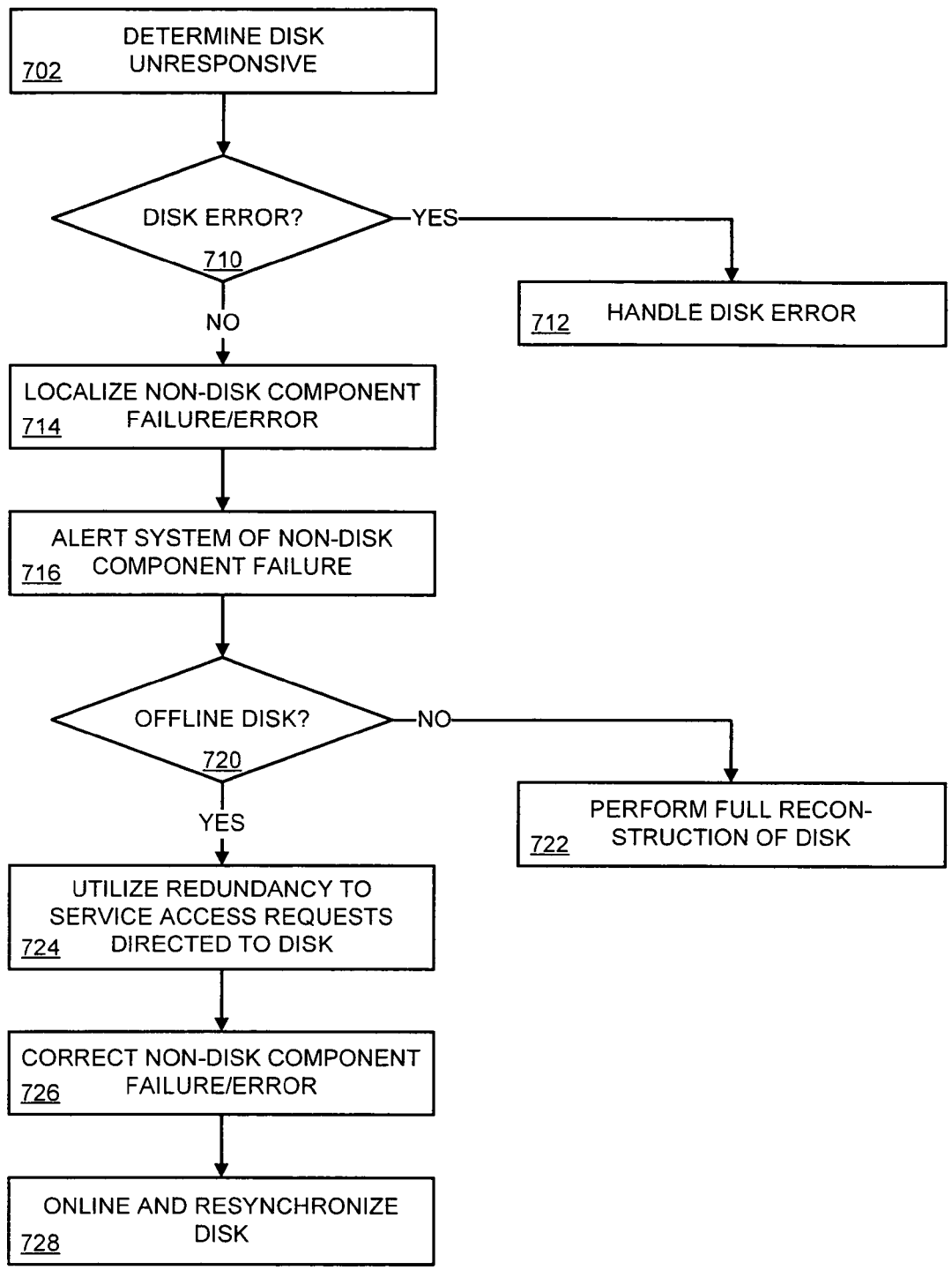
FIG. 7 is a flow diagram of an embodiment of a process for handling a non-disk component error.

FIG. 7 is a flow diagram of an embodiment of a process for handling a non-disk component error. A filer determines that a disk is unresponsive, 702. The disk, as discussed above, can be unresponsive for a variety of reasons, one of which includes the possibility that connectivity hardware and/or firmware associated with connectivity hardware may experience errors or failures. The filer determines whether the disk has an error, 710. Determining whether the disk has an error, or whether there is an error in the connectivity path is a process understood by those skilled in the art, and will thus not be discussed in detail. In general, diagnostics can be performed to localize an error, whether the cause of unresponsiveness is with connectivity hardware or the disk itself.

If the disk has an error, the filer handles the disk error, 712. Handling the disk error may include temporarily offlining the disk, as discussed previously. The disk may otherwise be failed out of the system and replaced. However, if the disk itself does not have the error, a non-disk component of the storage subsystem is experiencing an error, and the filer performs operations to localize the non-disk component that is experiencing the failure/error, 714. When a component is experiencing an error, a standard error processing routine may be executed, for example, to determine if the component should be declared failed, or if the error is transient. In either case, the process of localizing the malfunctioning component can be considered to be alerting the system of the non-disk component failure, 716. Alerting the system of the non-disk component failure may also, or alternatively involve more formal error messages, flagging of components, and/or generating reports for the system and/or a system administrator.

Depending on the error, the system may determine to offline the disk, 720. In one embodiment offlining the disk is employed for an error perceived by the system (e.g., based on diagnostics) that are temporary and do not affect a number of disks in any particular logical group more than a number of failures supported by the group (e.g., one for RAID4, two for RAID-DP). A disk that is offlined may be flagged, or marked, in the system to enable the system to identify the disk as temporarily unavailable for storage services. If the failure is deemed to not be recoverable by temporary offlining, the disk will be failed, replaced with a hot spare, and a full reconstruction of the disk will be performed to restore the data, 722.

However, if the disk can be offlined, the system will offline the disk and utilize redundancy of the disk group to service access requests directed to the disk, 724. This is performed as discussed above, with reads handled by reconstruction, and a writes tracked via a bitmap and/or logged in a dirty region. The error/failure associated with the determined non-disk component can be corrected (e.g., replace/repair the component) while the disk is offline, 726, and system as a whole can remain online and serving data. When the error is corrected, the disk can be onlined and resynchronized with any data differences caused by writes to the disk during its offline period, 728.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   determining that a storage unit of an array of storage units is unresponsive to input/output (I/O) transactions to request access to data stored on the storage unit, each storage unit of the array represented in a management device as a code object associated with a logical container representing the array of storage units;
   ceasing I/O transactions to the storage unit while permitting I/O transactions to other storage units of the array, including logically offlining the storage unit while maintaining the storage unit as part of the array of storage units by changing the code object to a state that prevents one or more operations from being performed on the code object and maintaining the code object associated with the logical container;
   servicing subsequent requests for access to data stored on the storage unit with I/O transactions to other storage units; and
   restoring I/O transactions to the storage unit after a period of time.

2. A method according to claim 1, wherein determining that the storage unit is unresponsive comprises determining that a controlled event has caused the storage unit to become unresponsive.

3. A method according to claim 2, wherein the controlled event comprises modifying firmware on the storage unit.

4. A method according to claim 2, wherein the controlled event comprises replacement of a component through which the storage unit is accessed.

5. A method according to claim 1, wherein determining that the storage unit is unresponsive comprises determining that a spontaneous event has caused the storage unit to become unresponsive.

6. A method according to claim 5, wherein the spontaneous event comprises an overrun of an I/O transaction queue associated with the storage unit.

7. A method according to claim 5, wherein the spontaneous event comprises a transient error in a component through which the storage unit is accessed.

8. A method according to claim 1, wherein ceasing I/O transactions to the storage unit comprises diverting subsequent I/O transactions directed to the storage unit to other storage units of the array to service the I/O transactions.

9. A method according to claim 1, wherein servicing the subsequent request for access comprises servicing a subsequent request for a read of data stored on the storage unit by reconstructing the requested data from other storage units in a redundant array.

10. A method according to claim 1, wherein servicing the subsequent request for access comprises servicing a subsequent request to write to a location of the storage unit by logging the location in a write table.

11. A method according to claim 1, wherein servicing the subsequent request for access comprises servicing a subsequent request to write to a location of the storage unit by writing to a dirty region, the data in the dirty region to be subsequently synchronized with the storage unit.

12. A method according to claim 11, wherein servicing the subsequent request for access comprises servicing a subsequent request to write by a filesystem associated with the array of storage units skipping the storage unit in a data write and writing to other storage units in the array to avoid writing to a dirty region.

13. An article of manufacture comprising a machine accessible storage medium having instructions stored thereon with which an electronic system performs operations including:
   determining that a drive of a redundant array of drives of a storage system is unresponsive to an input/output (I/O) transaction to request access to the drive, each drive of the array represented in a management device as a code object associated with a logical container that represents the array of drives;
   diverting a subsequent I/O transaction to request access to the drive to other drives in the storage system while leaving unaffected I/O transactions directed to other drive of the redundant array, including logically offlining the drive while maintaining the drive as part of the array of drives by changing the code object to a state that prevents one or more operations from being performed on the code object and maintaining the code object associated with the logical container;
   servicing the diverted I/O transaction with the other drives; and
   resuming I/O transactions to the drive after a condition causing the drive to become unresponsive has ended.

14. An article of manufacture according to claim 13, wherein the instructions for operations including determining that the drive is unresponsive comprises instructions for operations including receiving a command to indicate the I/O transaction to the drive should be diverted.

15. An article of manufacture according to claim 13, wherein the instructions for operations including determining that the drive is unresponsive comprises instructions for operations including receiving an exception indicating the drive is unresponsive.

16. An article of manufacture according to claim 13, wherein the instructions for operations including diverting the subsequent I/O transaction further comprises instructions for operations including flagging the drive as an offline drive.

17. An article of manufacture according to claim 16, wherein instructions for operations including flagging the drive as an offline drive further comprises instructions for operations including modifying a property of a code object representing the drive in a filesystem that generates the I/O transactions.

18. An apparatus comprising:
   a memory component having code stored thereon to define operations including logically isolating an unresponsive drive in a group of drives in a storage subsystem from access by a client of the storage subsystem, each drive in the group of drives represented in a management entity an a code object, where the group of drives is represented as a logical container of the objects representing each drive of the group, each drive including metadata to associate the drive to the group, the unresponsive drive including metadata to indicate a virtual state in the storage subsystem, where isolating the unresponsive drive includes logically offlining the drive while maintaining the drive as part of the group of drives by changing a state of the code object to change the virtual state of the drive, the state preventing one or more operations from being performed on the code object, and by maintaining the code object associated with the logical container, the code to further define operations including servicing requests for access to data stored on the unresponsive drive with other drives in the storage subsystem, and determining whether to allow access to the drive after a period of time; and
   a processor coupled to the memory component to execute the operations defined in the code.

19. An apparatus according to claim 18, wherein logically isolating the unresponsive drive further comprises preventing access to the drive by the client and still maintaining the metadata to indicate the virtual state of the drive in the storage subsystem.

20. An apparatus according to claim 18, wherein determining whether to allow access to the drive after the period of time comprises determining whether a condition that caused the drive to become unresponsive has been eliminated.

21. An apparatus according to claim 18, the memory further comprising code to define operations including forcing the drive online prior to a condition that caused the drive to become unresponsive has been eliminated, in response to a failure of another drive in the group of drives.

22. An apparatus according to claim 18, the memory including code to implement a filesystem that allocates writes to the drives in the storage subsystem in an order, and wherein servicing requests for access to data stored on the unresponsive drive with the other drives comprises directing the filesystem to skip the unresponsive drive in the write allocation order to avoid creating a dirty region.

23. A storage server comprising:
   a processor;
   a communication interface coupled to a network to interface with a client over the network;
   a storage interface coupled to a mass storage subsystem to access one or more mass storage devices of the subsystem on behalf of the client; and
   a memory coupled to the processor having software, which when executed by the processor, causes the storage server to determine that a disk of a redundant array of independent disks (RAID) group is unresponsive to an access request, to offline the unresponsive disk by marking the disk as unavailable for access in a logical organization of the RAID group, to fulfill subsequent requests for read access to the offlined disk with reconstructing data reconstructed from the other disks of the RAID group and subsequent requests for write access to the offlined disk with writes to a dedicated temporary write region, and to online the disk when it becomes responsive to a further access request, where each disk is represented as a code object and the RAID group is represented as a logical container associated with a group of code objects, where marking the disk as unavailable includes changing a state of an object that represents the disk, the state preventing one or more management operations from being performed on the code object, and maintaining the code object associated with the logical container.

24. A method comprising:
   representing each storage unit of an logical array of storage units of a storage system as a code object within a storage system management device, where each storage unit is associated with a logical container that represents the logical array of storage units, each code object having an associated operational state;

determining that a storage unit of the logical array of storage units is unresponsive to input/output (I/O) transactions to request access to data of the storage unit;

changing the operational state of the code object representing the storage unit to an offline state while maintaining the code object associated with the logical container, where the offline state makes the code object inaccessible for one or more operations by the management device, and maintaining the code object associated with the logical container in the offline state causes the storage unit to remain part of the logical array but be inaccessible to I/O operations;

servicing subsequent requests for access to data stored on the storage unit with I/O transactions to other storage units; and restoring I/O transactions to the storage unit after a period of time.

25. A method according to claim 24, wherein determining that the storage unit is unresponsive comprises determining that a controlled event has caused the storage unit to become unresponsive, the controlled event being one or more of modifying firmware on the storage unit, or replacement of a component through which the storage unit is accessed.

26. A method according to claim 24, wherein determining that the storage unit is unresponsive comprises determining that a spontaneous event has caused the storage unit to become unresponsive, the spontaneous event including one or more of an overrun of an I/O transaction queue associated with the storage unit, or a transient error in a component through which the storage unit is accessed.

* * * * *